United States Patent [19]

Mori et al.

[11] Patent Number: 4,985,819

[45] Date of Patent: Jan. 15, 1991

[54] AC-DC-AC APPARATUS HAVING BATTERY CHARGING AND DISCHARGING FEATURE

[75] Inventors: Haruyoshi Mori; Nobuo Sashida, both of Hyogo, Japan

[73] Assignee: Mitsubishi Denki Kabushiki Kaisha, Tokyo, Japan

[21] Appl. No.: 423,238

[22] Filed: Oct. 18, 1989

[51] Int. Cl.[5] ............................ H02M 5/44; H02J 7/00
[52] U.S. Cl. ......................................... 363/37; 307/66; 320/14; 363/48
[58] Field of Search ...................... 307/66; 363/34, 36, 363/37, 47, 48; 320/14

[56] References Cited

U.S. PATENT DOCUMENTS

| | | | |
|---|---|---|---|
| 4,340,823 | 7/1982 | Miyazawa | 307/66 |
| 4,410,935 | 10/1983 | Dang | 363/37 |
| 4,827,151 | 5/1989 | Okado | 363/37 |

OTHER PUBLICATIONS

Thyristor Practical Manual, OHM Co., Ltd, Sep. 30, 1978, p. 400.

*Primary Examiner*—William H. Beha, Jr.
*Attorney, Agent, or Firm*—Bernard, Rothwell & Brown

[57] ABSTRACT

An inverter apparatus having a reactor which suppresses ripple components contained in a charging current for a battery and is saturated when a current having a value larger than a predetermined value flows therethrough to have a very small inductance and allowing a small size and a low cost thereof to be designed.

4 Claims, 5 Drawing Sheets

AC-DC-AC APPARATUS HAVING BATTERY CHARGING AND DISCHARGING FEATURE

BACKGROUND OF THE INVENTION

1. Field of the Invention

This invention relates to an inverter apparatus which is combined with a battery employed in a non-failure power unit and the like.

2. Description of the Prior Art

FIG. 1 is a circuit diagram of an inverter apparatus combined with a conventional battery which has been shown in, for example, the thyristor usage manual P-406 (published by OHM Co. Ltd. on Sept. 30, 1988). In FIG. 1, reference numeral 1 is an input terminal connected to an AC power source not shown, 2 a rectifier which is constituted by thyristors 2a to 2d controlled by a control unit not shown to convert an AC voltage supplied to the input terminal into a DC voltage, 3 a reactor which absorbs ripple components of the DC voltage, 4 a capacitor which absorbs ripple components of the DC voltage, 5 an inverter which is constituted by self-arc-extinguishing type semiconductors 5a to 5d such as transistors etc. to convert a DC voltage obtained across the capacitor 4 into an AC voltage, 6 a control circuit which controls the inverter 5 and varies an output AC voltage, 7 and 8 are a reactor and a capacitor, respectively, both of which constitute a filter for absorbing ripple components of the output AC voltage of the inverter 5, 9 is an AC output terminal, and 10 a battery which is connected in parallel to the capacitor for absorbing ripple components of the DC voltage.

Next, the operation will be described. When an AC power source connected to the input terminal 1 is normal, an input AC voltage is converted into a DC voltage by the rectifier 2, and the converted DC voltage is controlled to a desirable value by the phase control of the thyristors 2a to 2d.

The DC voltage contains ripple components caused by rectifying the AC voltage. But, the ripple components are absorbed in the reactor 3 and the capacitor 4 to supply a DC voltage having a little amount of ripple components to the inverter 5.

The inverter 5 converts the DC voltage into a predetermined AC voltage, which is controlled by the control circuit 6 so as to become a desirable voltage and a desirable waveform by switching control of transistors 5a to 5b.

The output AC voltage of the inverter 5 contains ripple components due to switching of the transistors 5a to 5d. But, the ripple components are absorbed by the reactor 7 and the capacitor 8, and an AC voltage having no ripple component substantially is output to the output terminal 9.

The capacitor 4 in the DC circuit also absorbs a ripple current generated on the DC side by the inverter 5. Also, the battery 10 connected to the DC circuit is being floating-charged in this state. Since, if a charging current of the battery 10 contains ripple components, heat due to the ripple components is generated in the battery 10, the ripple components are suppressed so as to be reduced below a predetermined value by the reactor 3.

On the other hand, in the case where the AC power source is subjected to power failure, since a DC voltage is supplied to the DC circuit from the battery 10, the inverter 5 converts the DC voltage into an AC voltage and output the AC voltage. The output terminal 9 is continuously supplied with an AC voltage which is fed to load devices irrespective of power failure in the input AC power source. That is, the inverter apparatus operates as a non-failure power unit. Since a conventional inverter apparatus is constituted as described above, a reactor having a large inductance has needed to be employed for the reactor 3. In other words, even if the DC circuit contains a little amount of ripple components, the inverter 5 is capable of outputting an AC voltage which is not influenced by the ripple components. But, in order to reduce ripple components in a charging current of the battery 10, the large-sized reactor 3 having a large inductance needs to be employed.

SUMMARY OF THE INVENTION

This invention is devised in order to solve such problems as described above, and it is an object of this invention to provide an inverter apparatus in which a small-sized DC smoothing reactor is employed.

The inverter apparatus related to this invention is connected in series to a battery connected in parallel to the DC voltage output side of a rectifier which converts an AC voltage into a DC voltage and provided with a reactor which suppresses ripple components contained in a charging current when the battery is charged with the DC voltage of the rectifier and is saturated with a discharging current having over a predetermined value when the battery is discharged.

Another object and an advantage of this invention will be apparent by the following detailed description of the embodiment with reference to accompanying drawings.

DETAILED DESCRIPTION OF THE PREFERRED EMBODIMENTS

Figure 1:
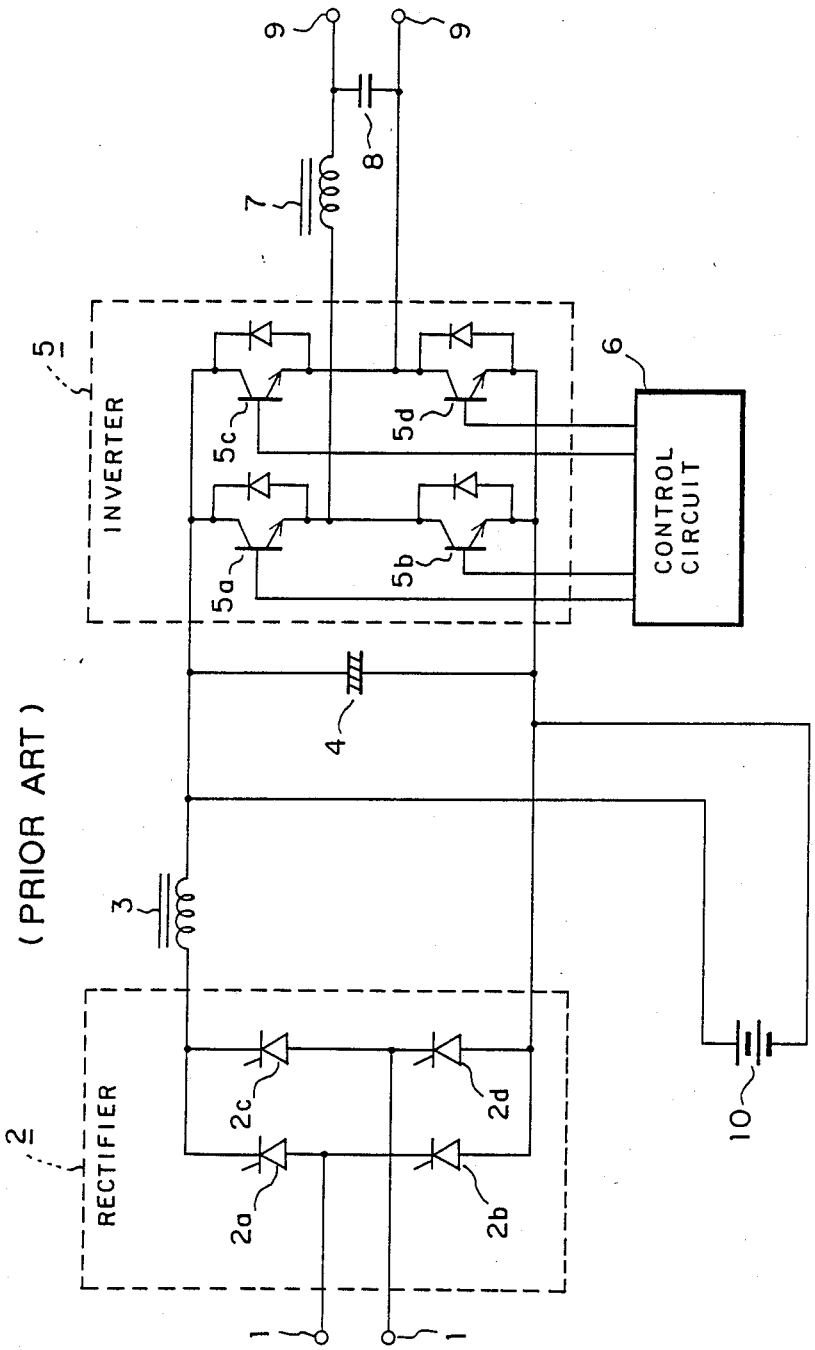
FIG. 1 is a circuit diagram showing a conventional inverter apparatus.
Figure 2:
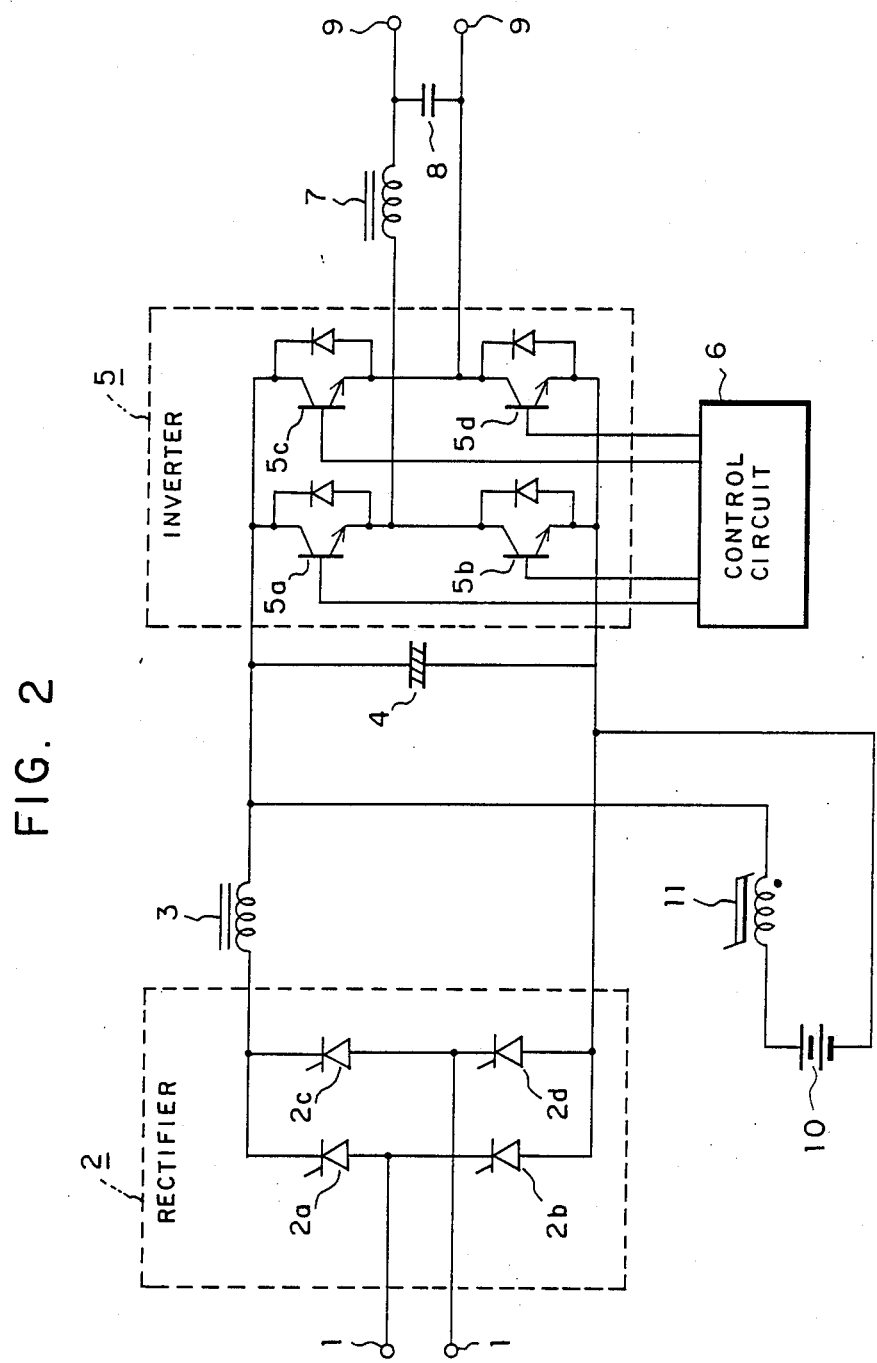
FIG. 2 is a circuit diagram showing an inverter apparatus according to a first embodiment of this invention.
Figure 5:
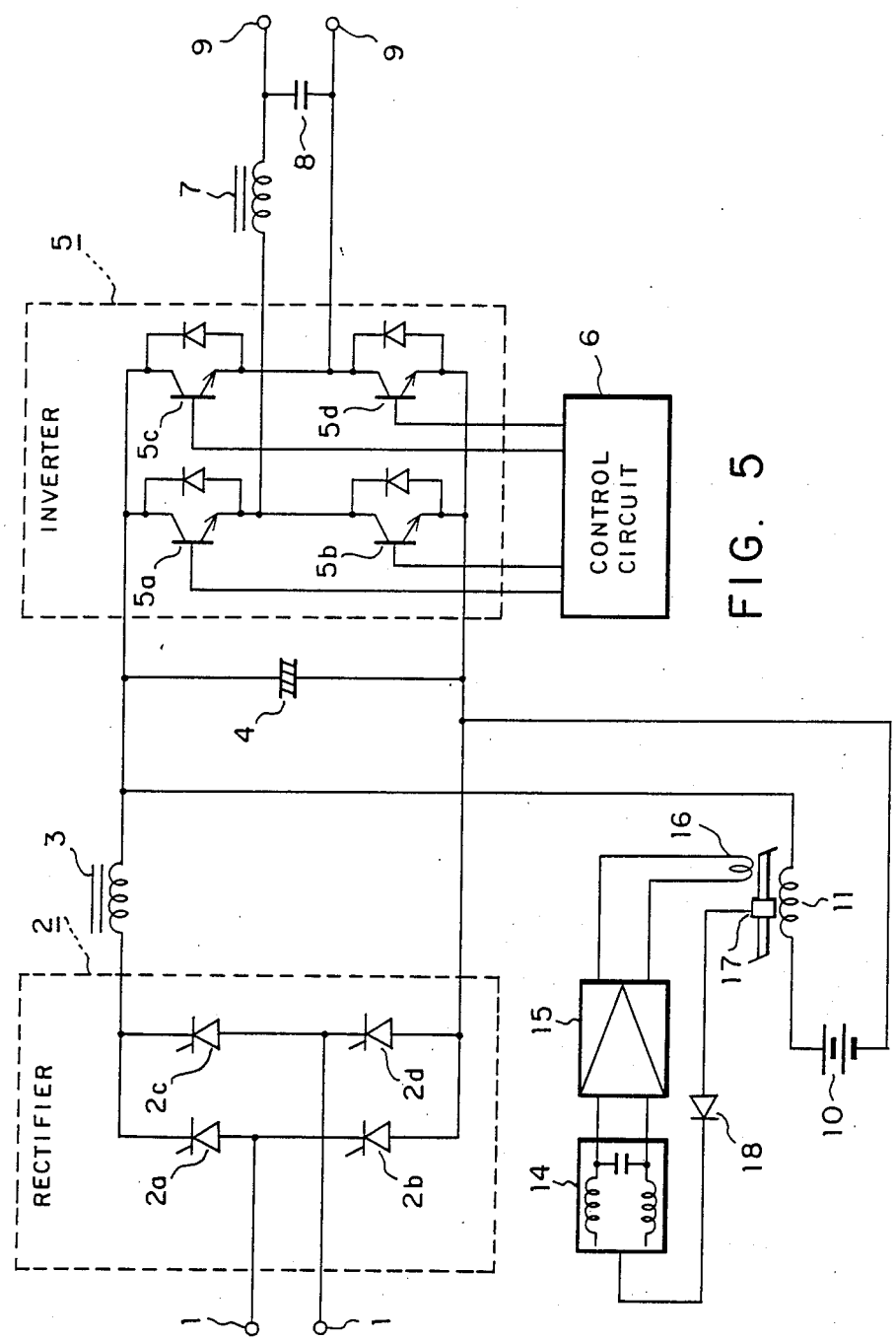

Hereinafter, an embodiment according to this invention will be described with reference to in FIG. 2 in which same parts as those in FIG. 5 are identified by the same numerals. In FIG. 1, reference numeral 11 is a saturable reactor connected in series between the battery 10 and the DC circuit of the inverter apparatus.

Next, the operation of the embodiment will be described. Now, the level of the saturation current of the saturable reactor 11 is set to a value higher than the value of the charging current of the battery 10. When the battery 10 is being floating-charged, the reactor 11 has a predetermined inductance value and ripple components of its charging current are suppressed below an allowable value.

Figure 3:
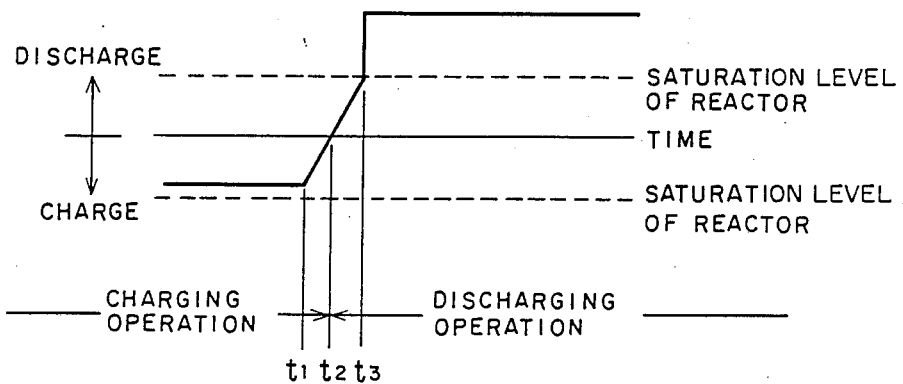
FIG. 3 is a diagram explanatory of the operation of the first embodiment.
Figure 3:
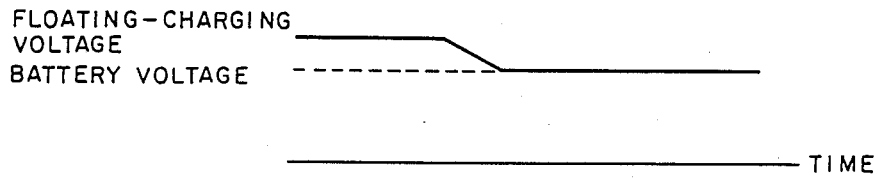

Next, the operation when the AC power source is subjected to power failure will be described based on a chart of the battery current in FIG. 3. Since, when power failure occurs at the time point $t_1$, the voltage of the DC circuit lowers, a charging current for the battery 10 decreases. The charging current for the battery 10 is reversed in polarity and brought into a discharge state at the time point $t_2$.

Furthermore, since the reactor 11 is saturated and its inductance is substantially reduced to zero when the discharging current is over the saturation level of the reactor 11 at the time point $t_3$, the discharging current suddenly increases, and consequently it becomes equal to the DC current of the inverter 5 and the voltage of the DC circuit becomes equal to the battery voltage.

Incidentally, energy is supplied to the DC circuit of the inverter 5 from the capacitor 4 during the time interval $t_1$ to $t_3$.

The magnetic core of the reactor 11 needs only to be set in such a manner that it is saturated with a current having a value a little larger than the maximum value of the charging current and the current capacity of the windings of the reactor 11 withstands its discharging current. Since the discharging time is determined by the battery capacity, it is possible to adopt a short-term rating for the windings.

Moreover, since the charging current is also determined by the capacity of the battery 10, it is possible from a detailed investigation of temperature rise to reduce the level of the saturation current of the reactor and plan the miniaturization of the reactor by saturating the reactor in the range where an initial charging current during a short time is large and operating the reactor in such a manner that it suppresses ripple components from the time point when the charging current is decreased and brought into a floating charge state.

Figure 4:
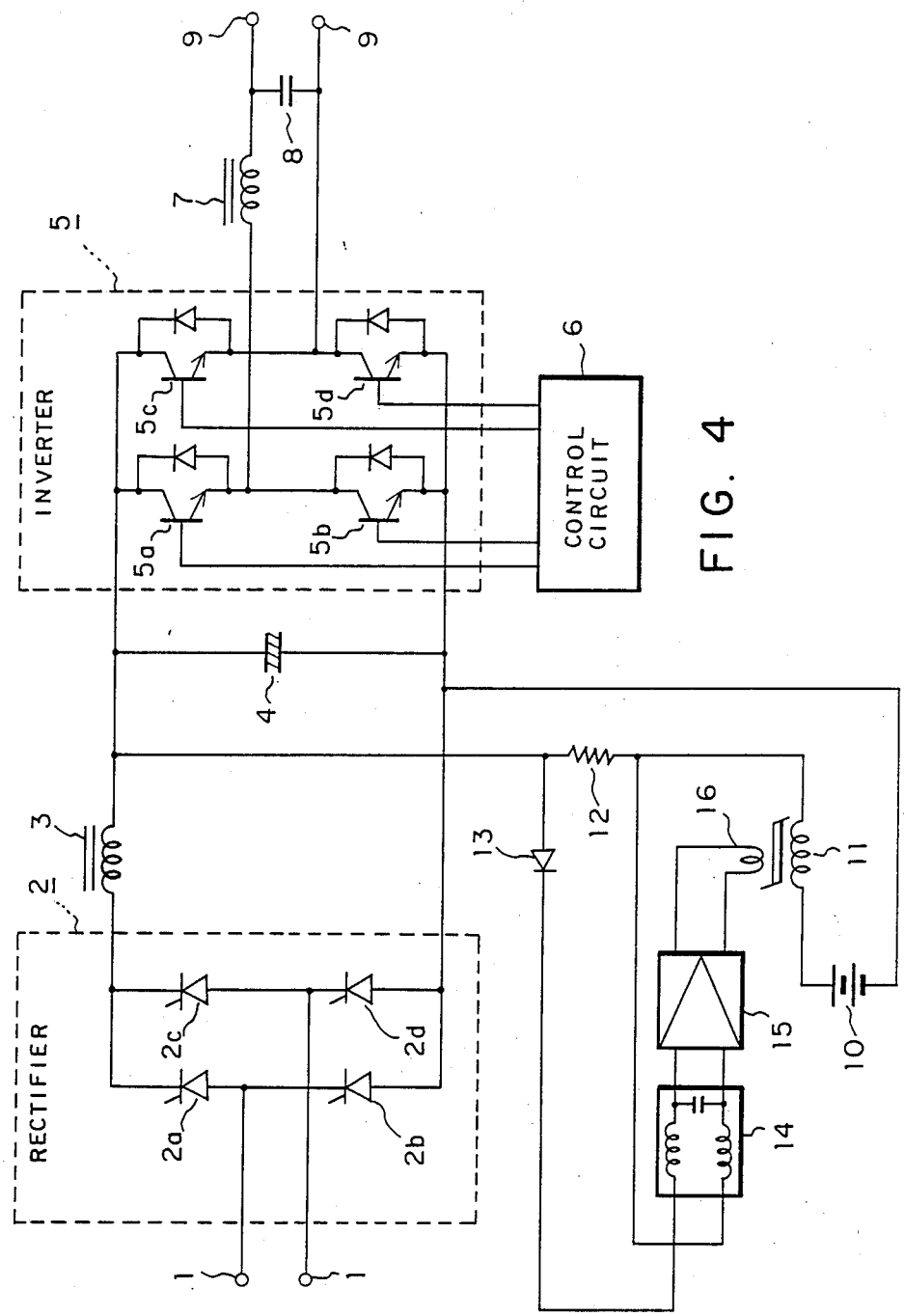
FIGS. 4 and 5 are circuit diagrams showing inverter apparatus according to second and third embodiments of this invention, respectively.

As shown under, FIG. 4 is a circuit diagram showing a second embodiment according to this invention. In FIG. 4, reference numeral 11 is a reactor connected in series to a battery 10, 12 a shunt resistor connected in series to the reactor 11, 13 a diode, 14 a lowpass filter into which a voltage generated when a current flows through the shunt resistor 12 via the diode 13 in the direction along which the battery 10 is charged is input, 15 an amplifier which amplifies an output of the lowpass filter 14, and 16 a second winding which is wound onto the reactor 11 and supplied with a current from the amplifier 15.

Next, the operation of the second embodiment will be described. When the battery 10 has been charged, a current on the DC component of which ripple components are superposed, flows through the shunt resistor 12, and a detecting voltage developed across the shunt resistor is input into the lowpass filter 14 via the diode 13.

The lowpass filter 14 removes only ripple components in the detecting voltage and passes the DC component. The amplifier 15 amplifies an output of the lowpass filter 14 and performs voltage-to-current conversion with a predetermined rate, thereby applying the converted current to a second winding 16 of the reactor 11.

When a current-to-voltage conversion rate A of the shunt resistor 12, a voltage-to-current conversion rate B of the amplifier 15, and a winding ratio n between the winding 16 and the main winding are selected so as to satisfy the following relation, that is, $$A \times B \times n = 1$$

a magnetic flux due to a DC current component flowing through the main winding of the reactor 11 is offset by a magnetic flux due to a current flowing through the second winding 16 and substantially reduced to zero. Accordingly, the reactor 11 has an inductance only for the ripple components and operates so as to suppress flowing of a ripple current into the battery 10.

Here, when the AC power source is subjected to power failure, the battery 10 converts its charging operation into its discharging operation, and the direction of the current flowing through the reactor 11 and the shunt resistor 12 is inverted. The polarity of the detecting voltage generated across the shunt resistor 12 is, therefore, inverted, and a current is blocked by the diode 13 and does not flow through the second winding 16.

Accordingly, the value of the discharging current for the battery 10 becomes larger than a predetermined value and consequently, since the reactor 11 has been saturated and has not substantially had no inductance, the rise of the discharging current is delayed by no means, thereby delaying the supply of power to the DC circuit by no means.

Faults in the lowpass filter 14, the amplifier 15, and the like can be easily detected by monitoring the output of the amplifier concerned.

FIG. 5 is a circuit diagram showing a third embodiment according to this invention. In FIG. 4, reference numeral 17 is a magnetic flux detecting element such as a Hall element connected to the lowpass filter 14 via a diode 18 and the like, which detects a magnetic flux of the magnetic, core of the reactor 11 and converts the magnetic flux into a voltage. When the battery 10 is being charged, the magnetic flux detecting element 17 detects the magnetic flux of the reactor 11, extracts only a DC component of the detected voltage using the lowpass filter 14, applies voltage-to-current conversion to the extracted DC component using the amplifier 15, and supplies the converted current to the second winding 16 of the reactor 11.

By properly selecting the detection coefficient of the magnetic flux detecting element 17, the voltage-to-current conversion rate of the amplifier 15, and the winding ratio of the second winding to the main winding of the reactor, a magnetic flux due to the DC component of the current flowing through the main winding of the reactor 11 becomes substantially zero, and the reactor 11 has inductance only for ripple components, thereby operating so as to suppress the ripple current flowing into the battery 10.

When the AC power source is subjected to power failure, the battery 10 is brought into a discharging operation, the polarity of the magnetic flux of the reactor 11 is inverted, the detected voltage from the magnetic detecting element 17 is blocked by the diode 18, no current flows through the second winding 16 of the reactor, and the reactor 11 is saturated like the embodiment.

Incidentally, though a combination of a single-phase thyristor converter and a single-phase transistor inverter is described in the embodiment, either one or both of them may be of a three-phase or multi-phase, and a system of a converter or an inverter may be arbitrary one. They all show the same effect as the embodiment.

As described above, according to this invention, since the reactor which suppresses ripple components in a charging current when the battery is charged and is saturated with a discharging current having a value larger than a predetermined value is constituted so as to connect it in series to the battery concerned, the magnetic core can be miniaturized, and consequently, the inverter apparatus can be obtained with a small-size and at a low-cost.

What is claimed is:

1. An inverter apparatus comprising:
   a rectifier which converts an AC voltage into a DC voltage and outputs the DC voltage;
   an inverter which converts said DC voltage into an AC voltage and supplies the AC voltage to a load;
   a battery which is connected in parallel to the DC voltage output side of said rectifier; and
   a reactor which is connected in series to said battery, suppresses ripple components contained in a charging current when said battery is charged by the DC output of said rectifier, and is saturated with a discharging current having a value larger than a predetermined value when said battery is discharged.

2. The inverter apparatus according to claim 1 provided with a magnetic flux canceling means which make substantially zero a magnetic flux due to a charging current flowing through the main winding of said reactor.

3. The inverter apparatus according to claim 2, wherein said magnetic flux canceling means comprises a shunt resistor connected in series to said reactor, a lowpass filter to which a detected voltage developed across said shunt resistor is input via a diode, and a winding which is supplied with an output of said lowpass filter to cancel and generate a magnetic flux due to a current flowing through the main winding of said reactor.

4. The inverter apparatus according to claim 2, wherein said magnetic flux canceling means comprises a magnetic flux detecting element which detects a magnetic flux due to a current flowing through the main winding of said reactor, a lowpass filter to which a detected voltage of said magnetic flux detecting element is input via a diode, and a winding which is supplied with an output of said lowpass filter to cancel and generate said magnetic flux.

* * * * *